United States Patent
Xu et al.

(10) Patent No.: US 12,431,813 B2
(45) Date of Patent: Sep. 30, 2025

(54) POWER CONVERTING SYSTEM

(71) Applicant: Delta Electronics (Shanghai) Co., Ltd., Shanghai (CN)

(72) Inventors: Fei-Dong Xu, Shanghai (CN); Yan-Long Li, Shanghai (CN); Lei Jia, Shanghai (CN); Meng-Yu Liang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 48 days.

(21) Appl. No.: 18/056,259

(22) Filed: Nov. 17, 2022

(65) Prior Publication Data

US 2023/0163692 A1 May 25, 2023

(30) Foreign Application Priority Data

Nov. 19, 2021 (CN) .......................... 202111375867.1
Nov. 3, 2022 (CN) .......................... 202211369741.8

(51) Int. Cl.
*H02M 3/335* (2006.01)
*B60L 53/16* (2019.01)
(Continued)

(52) U.S. Cl.
CPC ......... *H02M 3/33573* (2021.05); *B60L 53/30* (2019.02); *B60L 53/62* (2019.02);
(Continued)

(58) Field of Classification Search
CPC .... H02J 3/381; H02J 3/32; H02J 3/322; H02J 3/38; H02M 3/33573; B60L 53/20; B60L 8/003; B60L 53/51; B60L 53/53
See application file for complete search history.

(56) References Cited

U.S. PATENT DOCUMENTS 10,355,611 B2    7/2019  Nagashima et al.
2009/0279336 A1* 11/2009  Erdman .................. H02J 3/381
                                                    363/131
(Continued)

FOREIGN PATENT DOCUMENTS

CN        108336755 A      7/2018
WO        2021092658 A1    5/2021

OTHER PUBLICATIONS

Preetham Goli, PV Integrated Smart Charging of PHEVs Based on DC Link Voltage Sensing, 2014 (Year: 2014).*

(Continued)

*Primary Examiner* — Rexford N Barnie
*Assistant Examiner* — Rasem Mourad
(74) *Attorney, Agent, or Firm* — CKC & Partners Co., LLC

(57) ABSTRACT

A power converting system includes a power converting device, a protection device, and a charging device. The power converting device is coupled to a first and a second power source. The protection device is coupled to the power converting device, a load, and a grid, and switches electrical connections among the power converting device, the load, and the grid. The charging device is coupled to the power converting device and a third power source. The power converting device charges the third power source through the charging device, or receives electricity through the charging device. Select at least one power source of the first power source, the second power source, the third power source and the grid to provide electricity to the load according to multiple preset modes.

19 Claims, 14 Drawing Sheets

(51) Int. Cl.
  *B60L 53/30* (2019.01)
  *B60L 53/51* (2019.01)
  *B60L 53/53* (2019.01)
  *B60L 53/62* (2019.01)
  *H02H 7/122* (2006.01)
  *H02J 3/32* (2006.01)
  *H02J 3/38* (2006.01)
  *H02J 7/35* (2006.01)

(52) U.S. Cl.
  CPC ............ *H02H 7/1222* (2013.01); *H02J 3/32* (2013.01); *H02J 3/38* (2013.01); *H02J 3/381* (2013.01); *H02J 7/35* (2013.01); *H02M 3/33576* (2013.01); *B60L 53/16* (2019.02); *B60L 53/51* (2019.02); *B60L 53/53* (2019.02); *H02J 2300/26* (2020.01)

(56) References Cited

U.S. PATENT DOCUMENTS

| | | | | |
|---|---|---|---|---|
| 2011/0273130 | A1* | 11/2011 | Lee | H02S 40/32 320/101 |
| 2012/0268067 | A1* | 10/2012 | Poulsen | B60L 3/00 320/109 |
| 2013/0147272 | A1* | 6/2013 | Johnson | H02J 7/0068 307/29 |
| 2014/0049859 | A1* | 2/2014 | Wagoner | H02J 3/00 361/18 |
| 2016/0176305 | A1 | 6/2016 | James et al. | |
| 2017/0346292 | A1* | 11/2017 | Handelsman | H02M 7/44 |
| 2017/0358929 | A1* | 12/2017 | Koeppe | H02J 1/08 |
| 2018/0037121 | A1* | 2/2018 | Narla | B60L 55/00 |
| 2018/0201142 | A1* | 7/2018 | Galin | H02J 3/14 |
| 2020/0094691 | A1* | 3/2020 | Vidhi | G07F 15/005 |
| 2023/0049338 | A1* | 2/2023 | Kinomura | H02J 7/0045 |
| 2023/0231409 | A1* | 7/2023 | Xu | H02J 3/322 307/65 |

OTHER PUBLICATIONS

Goli Preetham et al, "PV Integrated Smart Charging of PHEVS Based on DC Link Voltage Sensing", IEEE Transactions On Smart Grid, IEEE, May 1, 2014, vol. 5, No. 3, pp. 1421-1428.

\* cited by examiner

POWER CONVERTING SYSTEM

RELATED APPLICATIONS

This application claims priority to China Application Serial Number 202111375867.1 filed Nov. 19, 2021 and China Application Serial Number 202211369741.8 filed Nov. 3, 2022, which is herein incorporated by reference.

BACKGROUND

Field of Invention

The present disclosure relates to a converting device. More particularly, the present disclosure relates to a power converting system.

Description of Related Art

Solar battery charger system nowadays is usually constructed by multiple independent sub-systems. Photovoltaic (PV) energy storage system usually includes PV inverter and battery inverter to achieve energy conversion between new energy generation and energy storage through AC couple. Or Photovoltaic (PV) energy storage system achieves energy conversion between new energy generation and energy storage through DC couple. Electric vehicle (EV) charger is also connected to AC grid directly.

The Photovoltaic (PV) energy storage system and the electric vehicle charger are all independent devices. Since communication ports of each of the independent devices do not have a uniform standards and a uniform communication protocol, it is hard to communicate among the devices, such that it is not easy to achieve an electricity management among the whole system. In addition, each independent system needs independent grid-connected capacity, so the capacity of the AC ports will be not enough; and the installation cost and the maintenance cost are high.

SUMMARY

One aspect of the present disclosure is to provide a power converting system. The power converting system includes a power converting device, a protection device, and a charging device. The power converting device is coupled to a first power source and a second power source. The protection device is coupled to the power converting device, a load, and a grid, and configured to switch electrical connections among the power converting device, the load, and the grid. The charging device is coupled to the power converting device and a third power source. The power converting device charges the third power source through the charging device, or receives electricity of the third power source through the charging device. Select at least one power source of the first power source, the second power source, the third power source and the grid to provide electricity to the load according to multiple preset modes.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

According to the usual mode of operation, various features and elements in the figures have not been drawn to scale, which are drawn to the best way to present specific features and elements related to the present disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
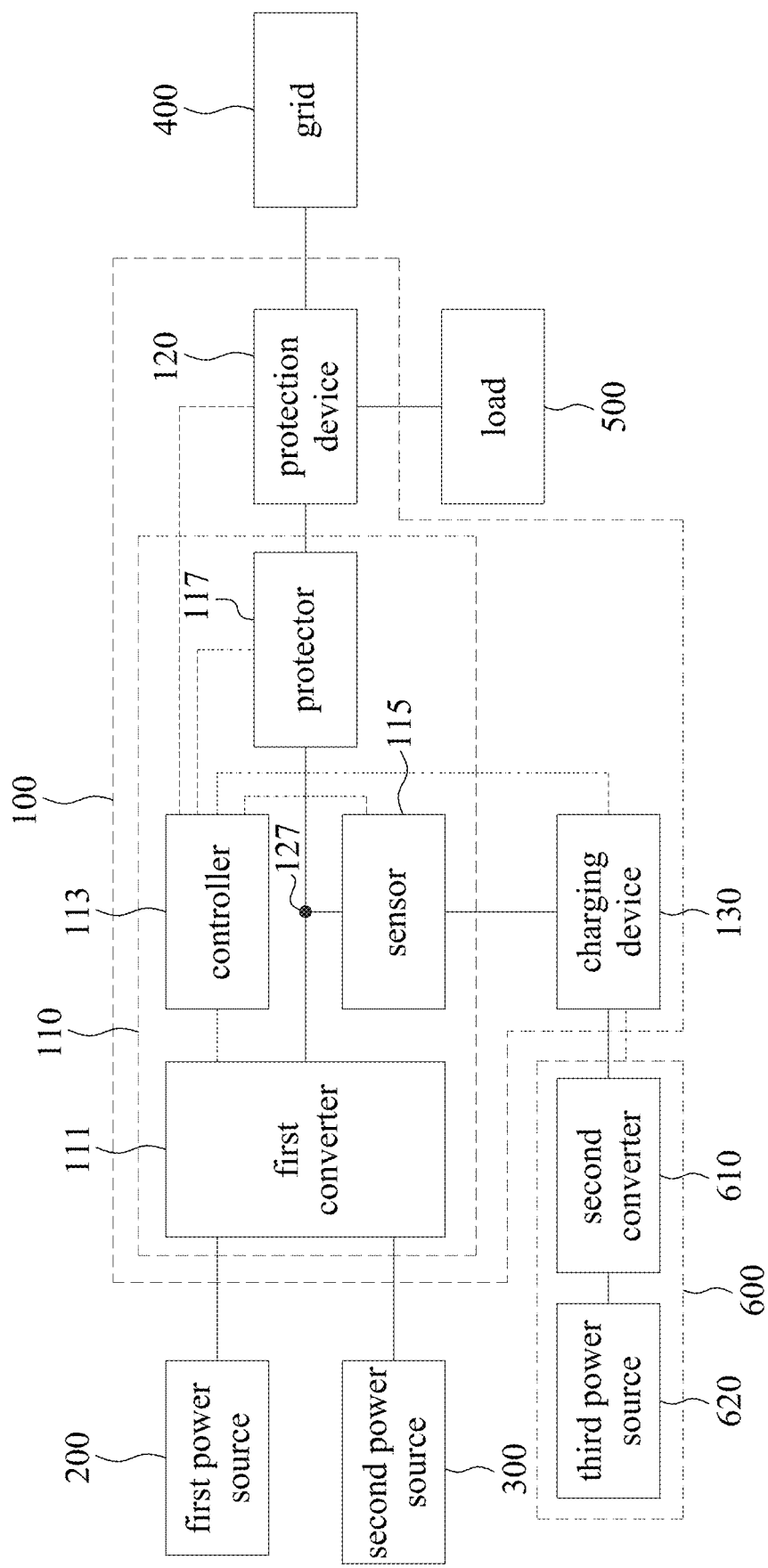
FIG. 1 depicts a schematic diagram of a power converting system according to one embodiment of the present disclosure.

FIG. 1 depicts a schematic diagram of a power converting system 100 according to one embodiment of the present disclosure. As shown in the figure, the power converting system 100 includes a power converting device 110, a protection device 120, and a charging device 130. The power converting device 110 is electrically connected to the protection device 120 and the charging device 130.

The power converting device 110 includes multiple input/output ports. Two input/output ports of the power converting device 110 are electrically connected to a first power source 200 and a second power source 300. Besides, another input/output port of the power converting device 110 is electrically connected to the protection device 120, and the power converting device 110 is electrically connected to a grid 400 and a load 500 through the protection device 120. In addition, still another input/output port of the power converting device 110 is electrically connected to the charging device 130, and the power converting device 110 is electrically connected to a movable energy storage device 600 through the charging device 130. In some embodiments, the input/output port can include plural input/output terminals.

For example, the first power source 200 can be a photovoltaics panel. Therefore, the first power source 200 is configured to convert solar energy into electrical energy, and provide the electrical energy to the power converting device 110. The second power source 300 can be energy storage battery. Therefore, the second power source 300 is configured to store electrical energy provided by the power converting device 110, and provide electrical energy to the power converting device 110 through the second power source 300 if necessary. In some operation modes, the second power source may be a power load for receiving and storing electricity.

Figure 2:
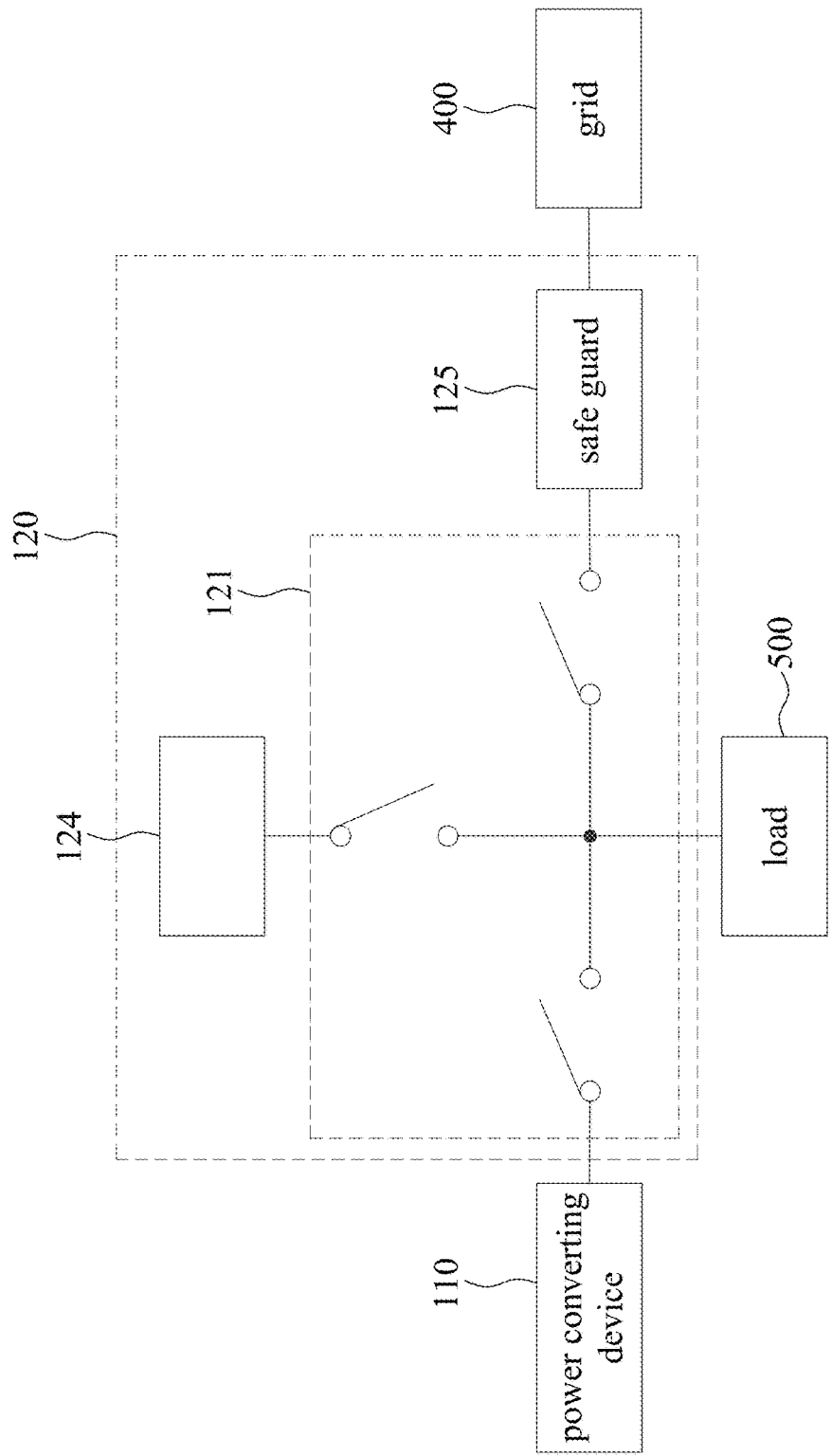
FIG. 2 depicts a schematic diagram of a protecting device of the power converting system shown in FIG. 1 according to one embodiment of the present disclosure.

As shown in FIG. 2, the protection device 120 includes a switch 121, a transformer 124, and a safe guard 125. The switch 121 can be a contactor or a relay. Therefore, the switch 121 can be configured to control a switch state among the power converting device 110, the grid 400, and the load 500. The transformer 124 can be an isolation transformer or an auto transformer, so as to perform a voltage-typed conversion. The safe guard 125 can be an overcurrent protection device or an electrical leakage protection device.

As shown in FIG. 1, the charging device 130 can be a charging gun, and the movable energy storage device 600 can be an electric vehicle. Therefore, the movable energy storage device 600 can be charged or discharged through the charging device 130. Specifically, the movable energy storage device 600 includes a second converter 610 and a third power source 620. The third power source 620 can be an energy storage battery. The charging device 130 provides electricity to the second converter 610, and the second converter 610 converts electricity and stores it in the third power source 620. In some operation modes, the third power source may be a power load for receiving and storing electricity.

In one embodiment, the power converting device 110 includes a first converter 111, a controller 113, a sensor 115, and a protector 117. The first converter 111 is electrically connected to the controller 113, the sensor 115, and the protector 117. The controller 113 is electrically connected to the sensor 115 and the protector 117.

For example, the first converter 111 includes multiple input/output ports. The first converter 111 can be configured to perform a DC/DC conversion, a DC/AC conversion, or an AC/DC conversion. The controller 113 is configured to control the whole system. For instance, the controller 113 can communication with the charging device 130 for controlling the movable energy storage device 600 to charge or discharge, or perform a protection function. The sensor 115 can be a current sampler, a voltage sampler, or a combination of the current sampler and the voltage sampler. The sensor 115 can detect the current, the voltage, and the power signal of the movable energy storage device 600, and provide the signals detected to the controller 113 for calculating the power of the movable energy storage device 600. Besides, the sensor 115 can be also configured to detect whether it is in an island state. The protector 117 can be a breaker, and can be configured to perform an overcurrent protection and an electrical leakage protection. The protector 117 can be used as equipment for activating the protection of the system. For example, when the sensor 115 detects the island state, the protector 117 will be activated to turn off a connection between the power converting system 100 and the grid 400.

As described above, the power converting system 100 of the present disclosure assembles input/output ports of the first converter 111 and the charging device 130 together. Therefore, house hold power distribution capacity does not have to be extended, such that the installation cost and the maintenance cost can be reduced. In addition, since multiple input/output ports are assembled, the volume and the weight can be decreased so as to achieve better thermal management, simpler connection, and so on. Besides, the power converting system 100 of the present disclosure includes the sensor 115 to detect the input/output of the charging device 130, so as to satisfy requirements of the grid 400 to electricity consumption, electricity generation, and support.

In one embodiment, the power converting device 110 is a multi-port converting controller. For example, the power converting device 110 is a four port converting controller. A port is connected to the first power source 200, a port is connected to the second power source 300, a port is connected to the charging device 130, and a port is connected to the protection device 120. The above-mentioned ports can be disposed in the power converting device 110 according to the application and the real system construction. The power converting device 110 can be used to power convert, control direction of the power flow, communicate with the inner system, communicate with the outer system, protect the system, and power manage.

In one embodiment, the controller 113 is a controlling and communicating core of the whole power converting system 100, which is used to implement a power conversion control, a communication with the inner system, a communication with the outer system, and a power management. The power conversion control can obtain the voltage and the current of the first power source 200 (e.g., photovoltaics panel) to calculate the power variation and the voltage variation so as to achieve the Maximum Power Point Tracking (MPPT) of the port of the first power source 200. Simultaneously, the power conversion control can obtain the voltage and the current of the first power source 200 (e.g., photovoltaics panel) to calculate the power variation and the voltage variation so as to control active power and reactive power of the alternative current to achieve the power factor control and the frequency control. The controller 113 can communicate with the charging device 130 and the movable energy storage device 600 for determining whether the movable energy storage device 600 (e.g., electric vehicle) operates at a charge mode or a discharge mode. The controller 113 can obtain the sampling signal of the sensor 115, and calculate the power of the movable energy storage device 600. The controller 13 can communicate with the protection device 120, and control the power converting device 110 to switch between on-grid work mode and off-grid work mode. The controller 113 can be connected to Could through a router to achieve remote data feedback, monitor, and software update. Those functions can be achieved by one or multiple controllers.

In one embodiment, the charging device 130 includes a power converter, a controller, a relay or a contractor, a detector and a communicator. The charging device 130 can be an AC charger-typed connector. The power converter is a power converting portion to achieve DC/DC conversion function, for example, an auxiliary power. The power converter can be a power converting portion to achieve DC/AC conversion function, for example, the second converter 610 can be disposed in the charging device 130. The controller can control the power converter, and the communicator can perform a communication between the movable energy storage device 600 and the controller 113. The relay or a contactor can connect or cut off a connection between the power converting device 110 and the movable energy storage device 600. The detector is used to detect related signals of the charging device 130, and the related signals includes a voltage signal, a current signal, a power signal, and a temperature signal.

The power converting system 100 of the present disclosure can provide the best power management in any state. The power converting system 100 of the present disclosure can select at least one power source of the first power source, the second power source, the third power source and the grid to provide electricity to the load according to multiple preset modes. The above-mentioned power management will be described in detail in the embodiments of FIG. 3 to FIG. 6.

Figure 3:
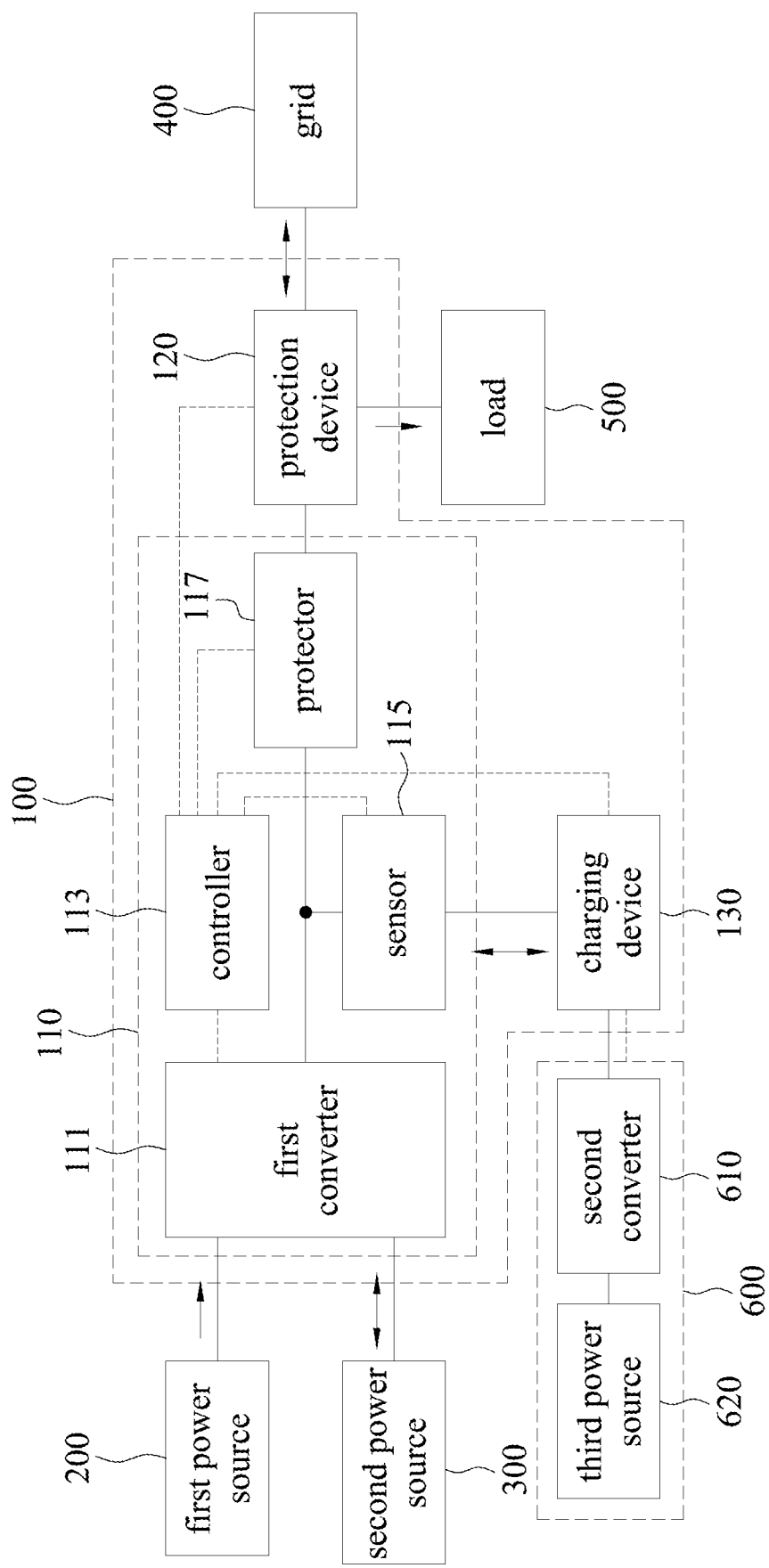
FIG. 3 depicts a schematic diagram of operating a power converting system according to one embodiment of the present disclosure.

FIG. 3 depicts a detailed schematic diagram of operating a power converting system 100 according to one embodiment of the present disclosure. In this embodiment, the power converting system 100 works in a first mode. The first mode is that the power converting system 100 works during daytime, and the grid 400 can provide electricity. That is to say, the power converting system 100 is in an on-grid work mode and the power of the first power source 200 (e.g., photovoltaics panel) is higher. The power converting device 110 controls the first power source 200 to charge the second power source 300 (e.g., energy storage battery) and the third power source 620 (e.g., energy storage battery), and provide electricity to the load 500. If there is still additional electricity, it can be provided to the grid 400. If the need of the load 500 cannot be satisfied, the grid 400 can provide electricity to the load 500.

If additional electricity cannot be used by the load 500, cannot be stored in the second power source 300 (e.g., energy storage battery) and the third power source 620 (e.g., energy storage battery), and cannot be provided to the grid 400, the power converting device 110 will limit the output power of the first power source 200 (e.g., photovoltaics panel).

Figure 4:
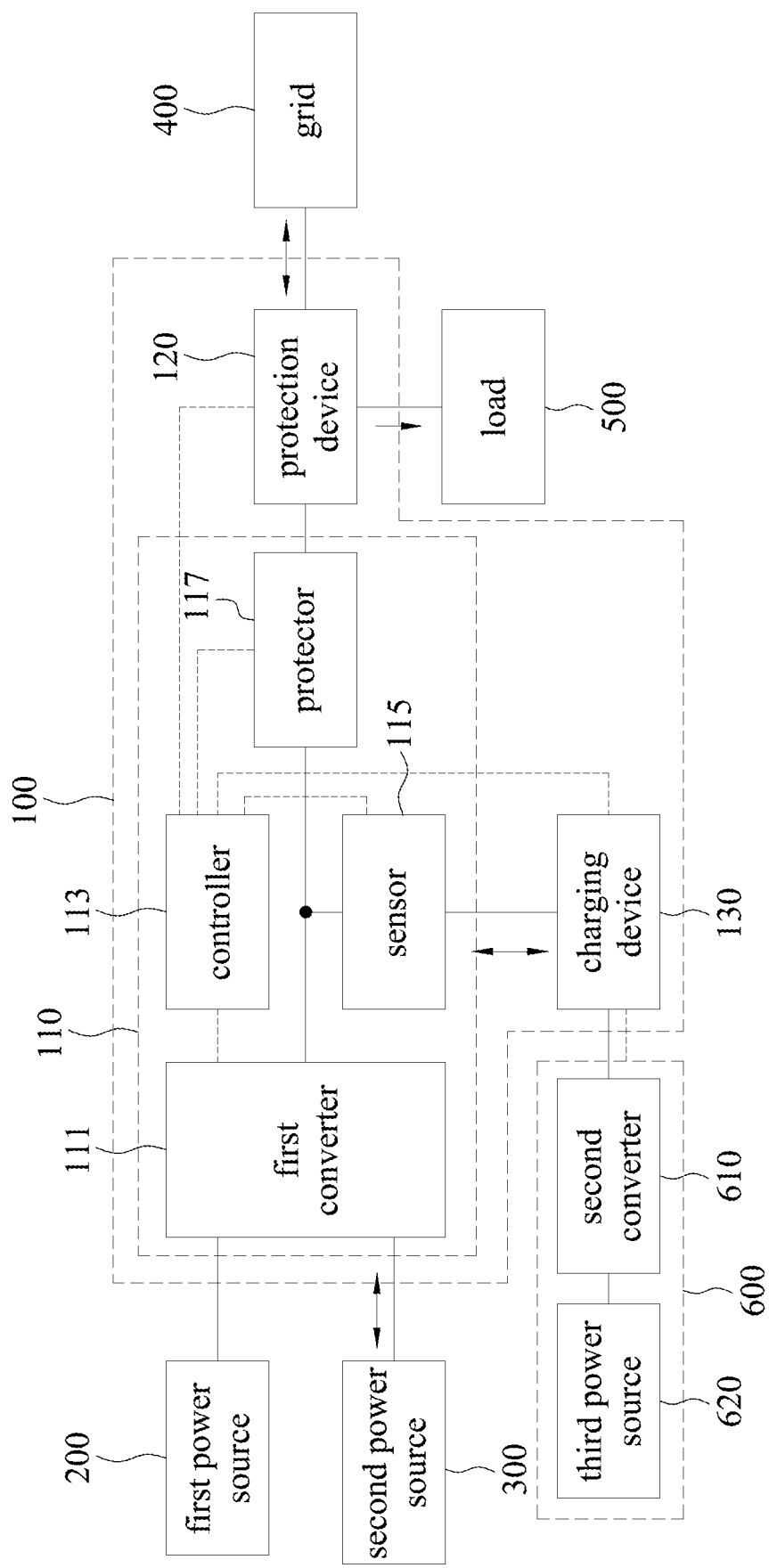
FIG. 4 depicts a schematic diagram of operating a power converting system according to one embodiment of the present disclosure.

FIG. 4 depicts a detailed schematic diagram of operating a power converting system 100 according to one embodiment of the present disclosure. In this embodiment, the power converting system 100 works in a second mode. The second mode is that the power converting system 100 works at night, and the grid 400 can provide electricity. That is to say, the power converting system 100 is in an on-grid work mode and the first power source 200 (e.g., photovoltaics panel) cannot generate electricity. The controller 113 collects voltage signals and current signals of all power ports of the power converting system 100 for obtaining related states, thereby adopting suitable electricity management. For example, electricity stored in the second power source 300 (e.g., energy storage battery) and the third power source 620 (e.g., energy storage battery) can be provided to the load 500. If the need of the load 500 cannot be satisfied, the grid 400 can provide electricity to the load 500.

In addition, if the power need by the load 500 is not high, the second power source 300 (e.g., energy storage battery) has the priority to provide electricity to the load 500, so as to make sure that the movable energy storage device 600 (e.g., electric vehicle) always has electricity for using. If the movable energy storage device 600 shall be used tomorrow and electricity of the movable energy storage device 600 is lacking, the movable energy storage device 600 can be charged by the grid 400 during off-peak time so as to achieve greater benefits.

Figure 5:
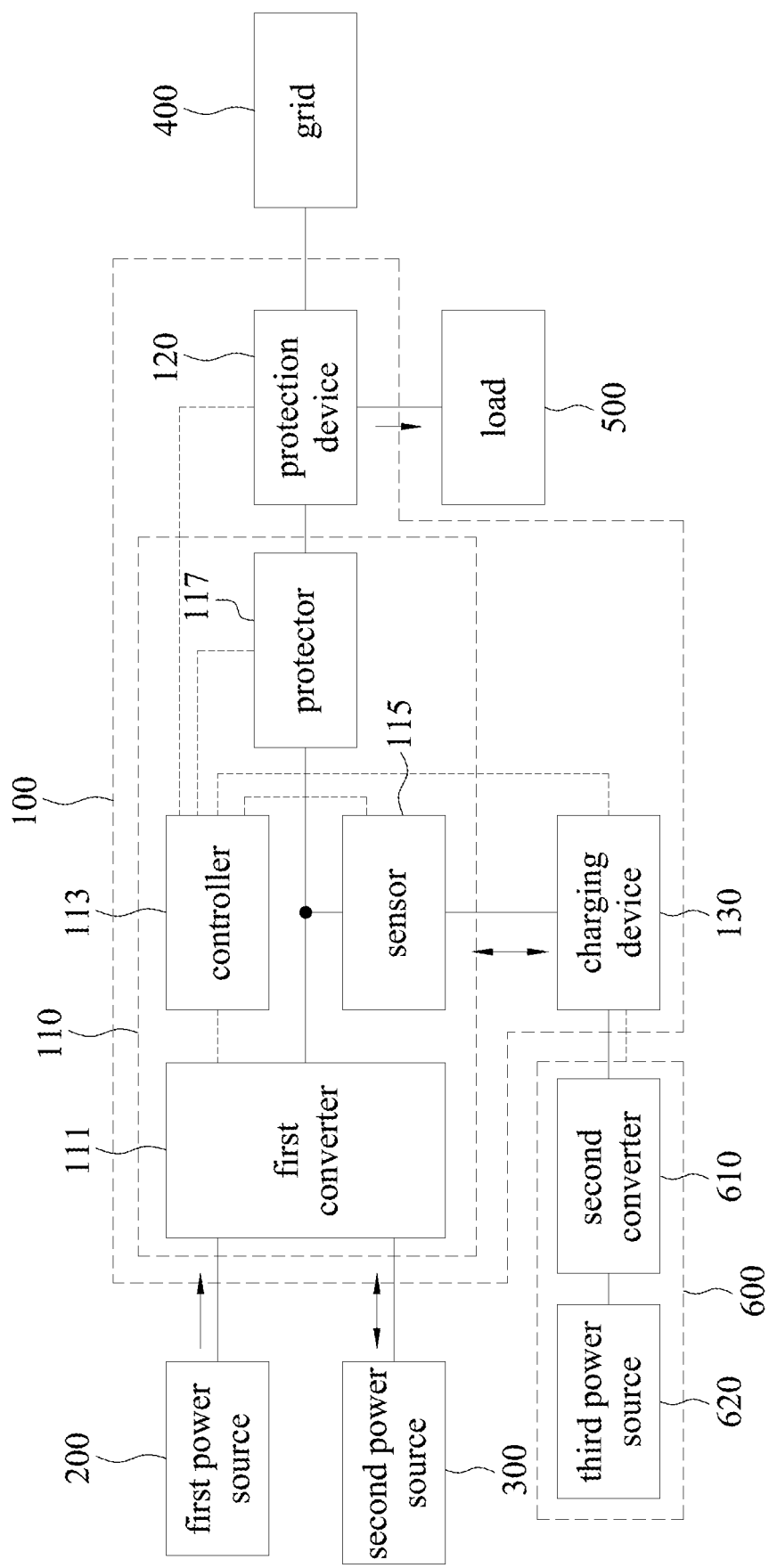
FIG. 5 depicts a schematic diagram of operating a power converting system according to one embodiment of the present disclosure.

FIG. 5 depicts a detailed schematic diagram of operating a power converting system 100 according to one embodiment of the present disclosure. In this embodiment, the grid 400 stops providing electricity, so the power converting system 100 works in an off-grid work mode. At this time, the controller 113 detects an island state through the sensor 115, and controls the protector 117 to turn off a connection between the power converting system 100 and the grid 400. The way to detect the island state can be active island detection or inactive island detection. In addition, the way to detect the island state can be performed through obtaining the voltage and the frequency of the grid 400.

Besides, the protection device 120 can switch the power converting system 100 from an on-grid work mode to an off-grid work mode through the switch 121 in FIG. 2. The switch between the on-grid work mode and the off-grid work mode not only can be performed by the power converting system 100 actively, but also can be performed manually. After accessing the off-grid work mode, the power converting system 100 can continuously provide electricity to the load 500 for the need of emergency electricity and continuous electricity, for example, emergency lighting, refrigerator, and so on.

In some embodiments, the power converting system 100 works in a third mode. The third mode is that the power converting system 100 works at daytime and the grid 400 stops providing electricity. That is to say, the power converting system 100 is in an off-grid work mode and the power of the first power source 200 (e.g., photovoltaics panel) is high. The power converting device 110 controls the first power source 200 to provide electricity to the load 500. If there is still additional electricity, the second power source 300 (e.g., energy storage battery) and the third power source 620 (e.g., energy storage battery) can be charged selectivity. If additional electricity is not used by the load 500, and cannot be stored in the second power source 300 and the third power source 620, the power converting device 110 will limit the output power of the first power source 200. Besides, if the power of the first power source 200 is not enough to provide electricity to the load 500, the second power source 300 and/or the third power source 620 can be used to provide electricity to the load 500.

Figure 6:
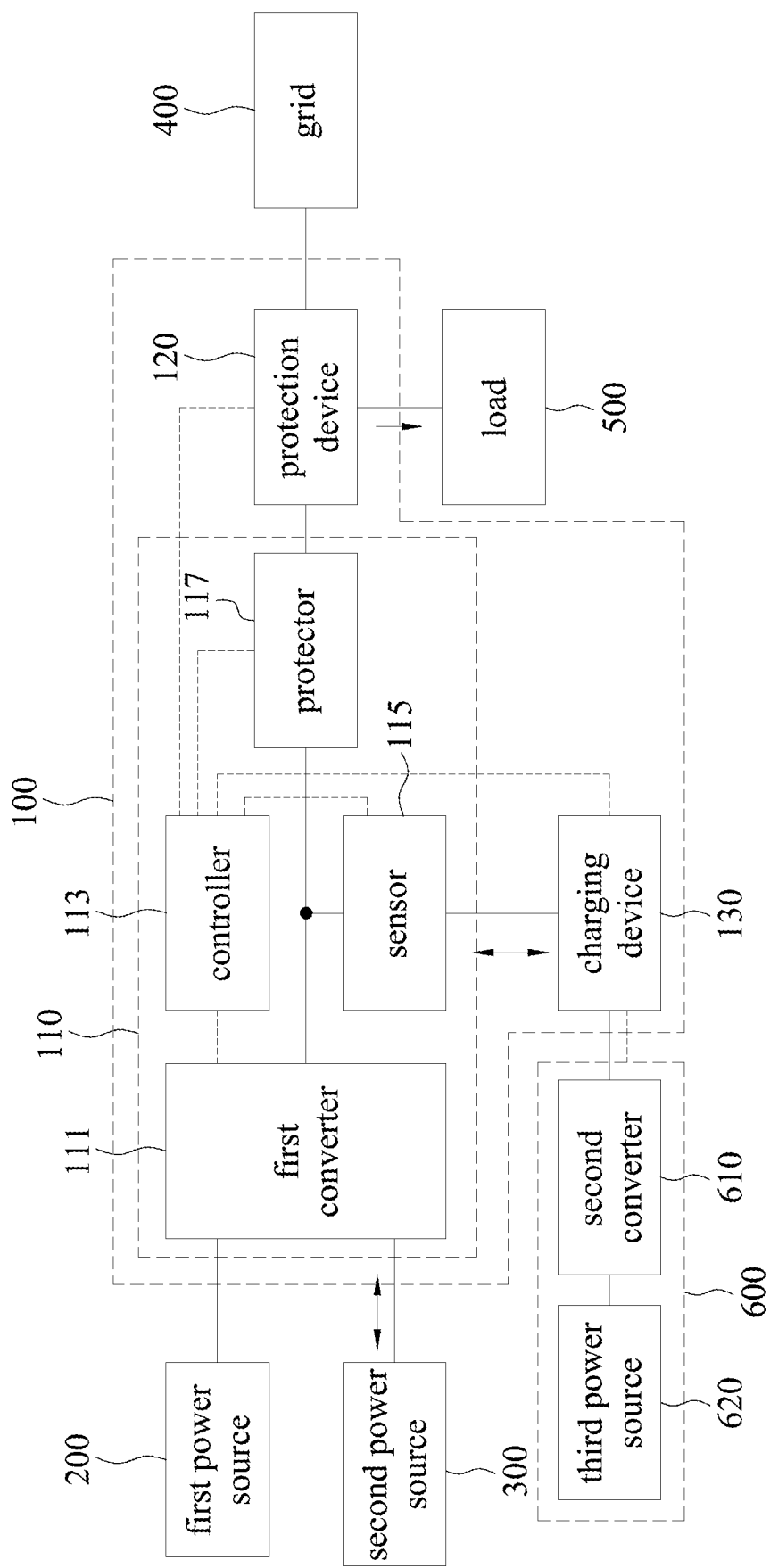
FIG. 6 depicts a schematic diagram of operating a power converting system according to one embodiment of the present disclosure.

FIG. 6 depicts a detailed schematic diagram of operating a power converting system 100 according to one embodiment of the present disclosure. In this embodiment, the power converting system 100 works in a fourth mode. The fourth mode is that the power converting system 100 works at night, and the grid 400 stops providing electricity. That is to say, the power converting system 100 is in an off-grid work mode and the first power source 200 (e.g., photovoltaics panel) cannot generate electricity. The second power source 300 (e.g., energy storage battery) and/or the third power source 620 (e.g., energy storage battery) can provide electricity to the load 500. If the need for the power of the load 500 is not high, the controller 113 will control the second power source 300 to provide electricity to the load 500 so as to ensure that the movable energy storage device 600 (e.g., electric vehicle) has electricity for usage at any time.

Figure 7:
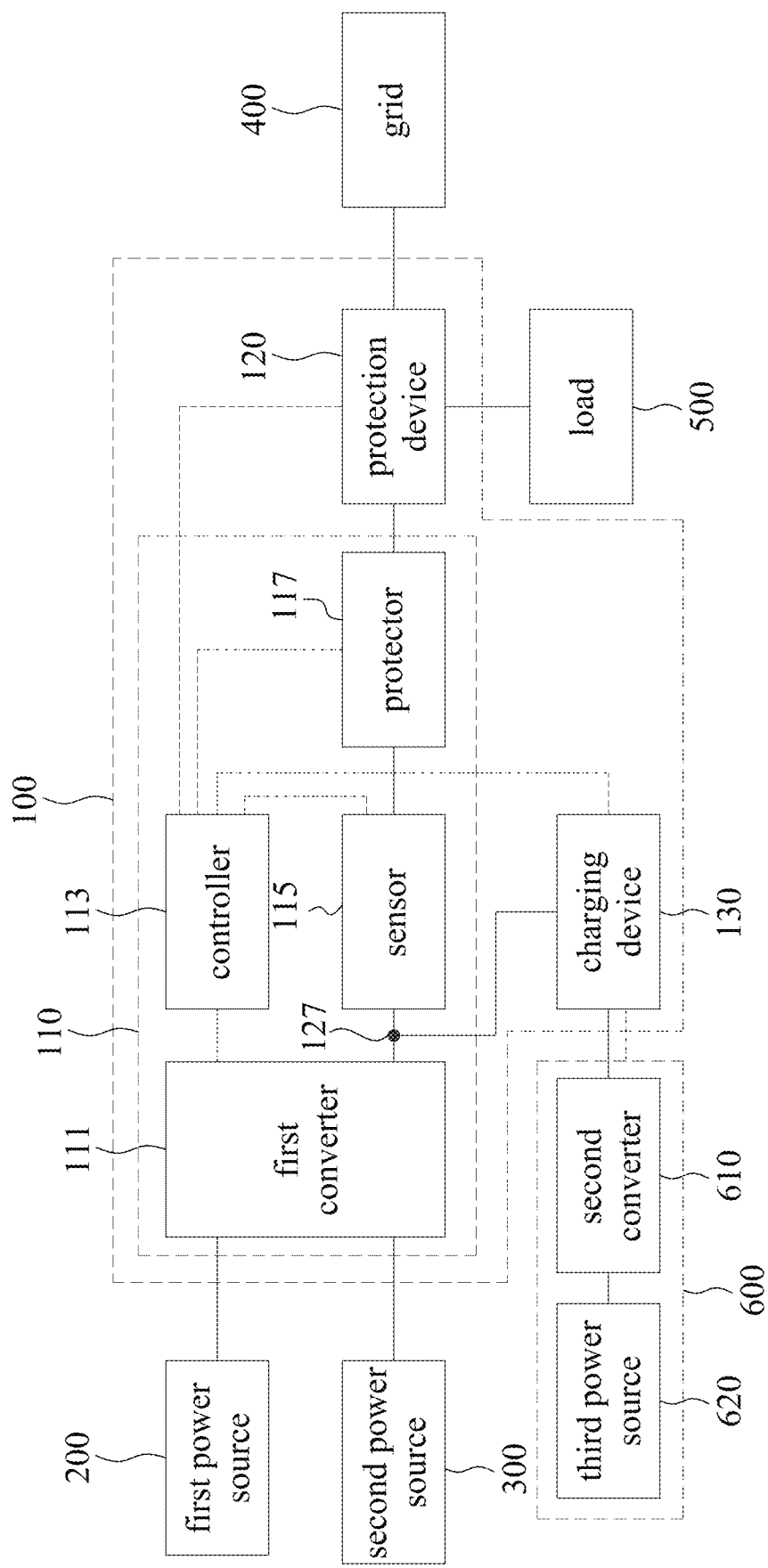
FIG. 7 depicts a schematic diagram of a power converting system according to one embodiment of the present disclosure.

FIG. 7 depicts a schematic diagram of a power converting system 100 according to one embodiment of the present disclosure. Compared to the power converting system 100 in FIG. 1, the sensor 115 of the power converting system 100 in FIG. 7 is not electrically connected to the charging device 130 in a direct way. At this time, the sensor 115 obtains signals at a public point 127 of the first converter 111 and the charging device 130 indirectly, and the related information of the charging device 130 can be obtained through calculation.

Figure 8:
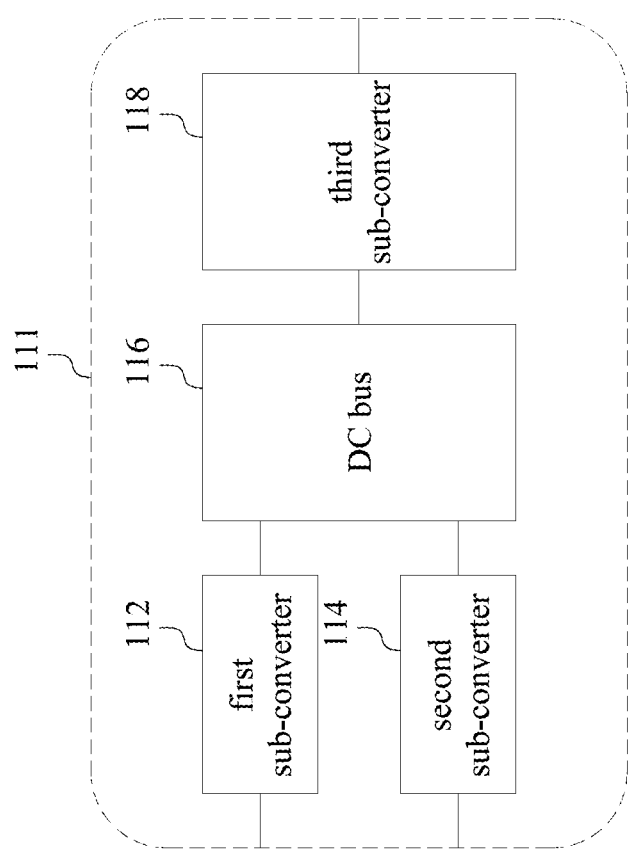
FIG. 8 depicts a schematic diagram of a power converting device of the power converting system shown in FIG. 7 according to one embodiment of the present disclosure.

FIG. 8 depicts a schematic diagram of the first converter 111 of the power converting device 110 of the power converting system 100 shown in FIG. 7 according to one embodiment of the present disclosure. As shown in the figure, the first converter 111 of the power converting device 110 includes a first sub-converter 112, a second sub-converter 114, a DC bus 116, and a third sub-converter 118.

In one embodiment, the first sub-converter 112 is coupled to the first power source 200 and the DC bus 116, and configured to receive and adjust a power provided by the first power source 200. For example, the first sub-converter 112 can be a unidirectional DC-DC converter, such as a boost converter, and the first power source 200 can be a DC power source. The unidirectional DC-DC converter 112 is configured to receive the power provided by the DC power source 200 and convert a port voltage of the DC power source 200 to fit the voltage of the DC bus 116.

In one embodiment, the second sub-converter 114 is coupled to the second power source 300 and the DC bus 116. The second sub-converter 114 is configured to receive and adjust a power provided by the second power source 300, or configured to charge the second power source 300. For example, the second sub-converter 114 can be a bidirectional DC-DC converter, such as a Dual Active Bridge (DAB) series resonance converter, and the second power source 300 can be a DC power source. The bidirectional DC-DC converter 114 is configured to receive the power provided by the DC power source 300 and convert a port voltage of the DC power source 300 to fit the voltage of the DC bus 116, or configured to charge the DC power source 300. The third sub-converter 118 is coupled to the DC bus 116, and the third sub-converter 118 is coupled to the protection device 120 through the sensor 115 and the protector 117. For example, the third sub-converter 118 can be a bidirectional DC-AC converter. The bidirectional DC-AC converter may be configured to receive the AC power from the grid 400 and convert the AC power into a DC power. The DC power obtained can be used to charge the second power source (e.g., high-voltage batteries) and/or the movable energy storage device (e.g., electric vehicle). The bidirectional DC-AC converter may be configured to receive the DC power from at least one DC power source and convert the DC power into a AC power. The AC power obtained can be provided to the grid 400 or the load 500, or be used to charge the movable energy storage device (e.g., electric vehicle).

Figure 9:
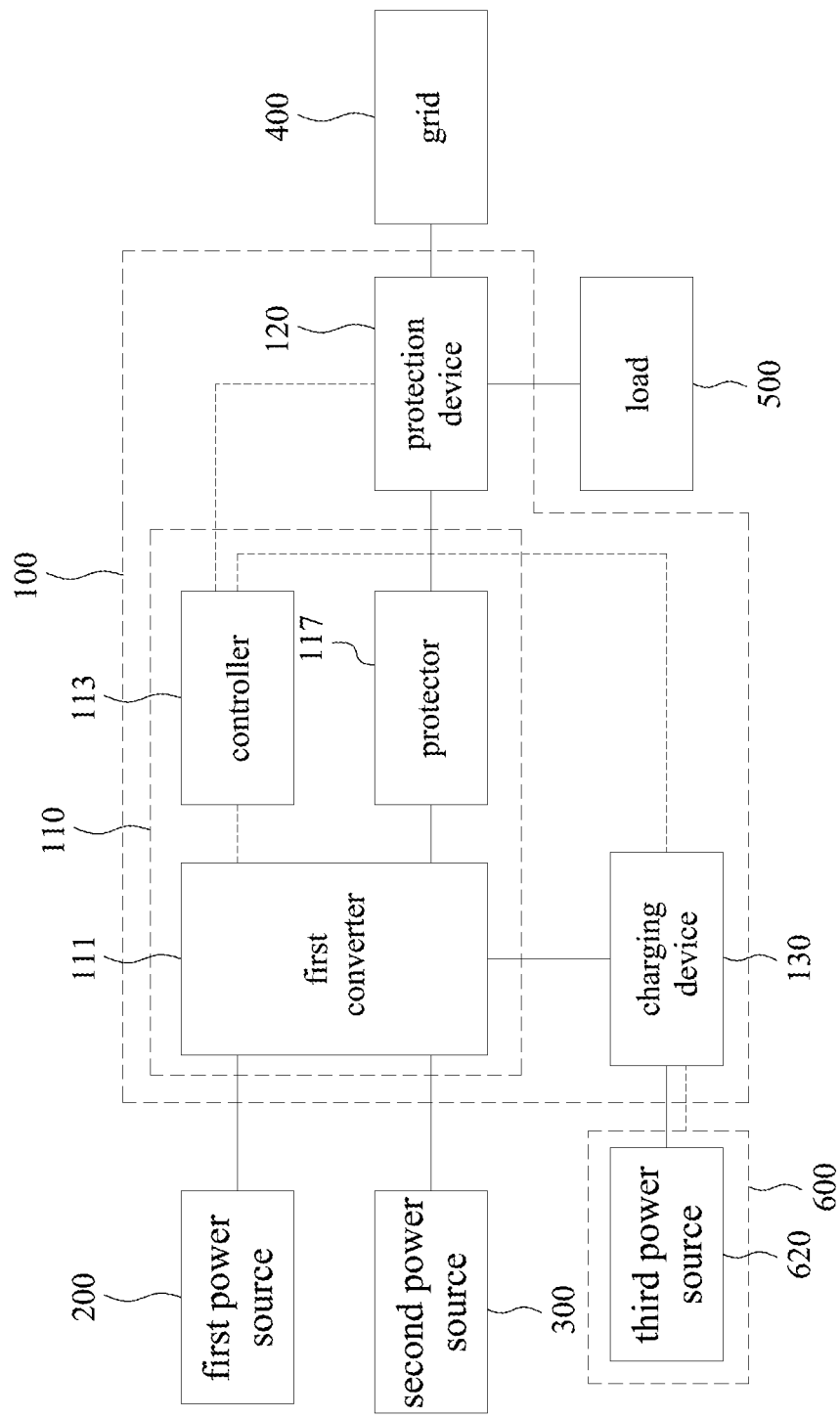
FIG. 9 depicts a schematic diagram of a power converting system according to one embodiment of the present disclosure.

FIG. 9 depicts a schematic diagram of a power converting system 100 according to one embodiment of the present disclosure. As shown in FIG. 9, the power converting device 110 of the power converting system 100 includes plural input/output ports. An input/output port of the power converting device 110 is electrically connected to the first power source 200, an input/output port of the power converting device 110 is electrically connected to the second power source 300. In addition, another input/output port of the power converting device 110 is electrically connected to the protection device 120, and the power converting device 110 is electrically connected to the grid 400 and the load 500 through the protection device 120. Besides, still another input/output port of the power converting device 110 is electrically connected to the charging device 130, and the power converting device 110 is electrically connected to the movable energy storage device 600 through the charging device 130.

For example, the first power source 200 can be Photovoltaics (PV) device. Therefore, the first power source 200 can be configured to convert solar energy into electrical energy, and provide the electrical energy to the power converting device 110. The second power source 300 can be an energy storage battery. Therefore, the second power source 300 can be configured to store electrical energy provided by the power converting device 110, and provide electrical energy to the power converting device 110 when needed.

The charging device 130 in FIG. 1 is coupled to the protector 117. For example, in one embodiment, the charging device 130 is coupled to an AC side of the power converting device 110, and is electrically connected to the protection device 120 through the protector 117, and further electrically connected to the grid 400 through the protection device 120. The charging device 130 in FIG. 9 is coupled to the DC bus 116 of the power converting device 110. Therefore, the third power 620 in FIG. 9 does not need the second converter 610 in FIG. 1. Accordingly, the controller 113 of the power converting system 100 can detect current, voltage, and/or power in the DC bus 116 to control a state of the port connected to the charging device 130, thereby satisfying the requirements of the movable energy storage device 600. In this embodiment, the charging device 130 includes a power converter, a controller, a relay or contactor, a detector, and a communicator. The charging device 130 can be a DC charging gun. The power converter is a part of the power conversion. The power converter can implement DC/DC conversion, for example supplying auxiliary power.

In the prior art, the charging device is coupled to a grid through a distribution board. In the present disclosure, the charging device 130 is coupled to AC side or DC bus of the power converting system 110, and the charge equipment (for example, electric vehicle) does not need to use grid-connected capacity independently. The power converting system of the present disclosure can integrate solar energy, storage energy, and charge energy. When introducing the charging equipment, the solar energy and energy storage equipment will be considered, so as to enhance usage efficiency of renewable energy.

Figure 10:
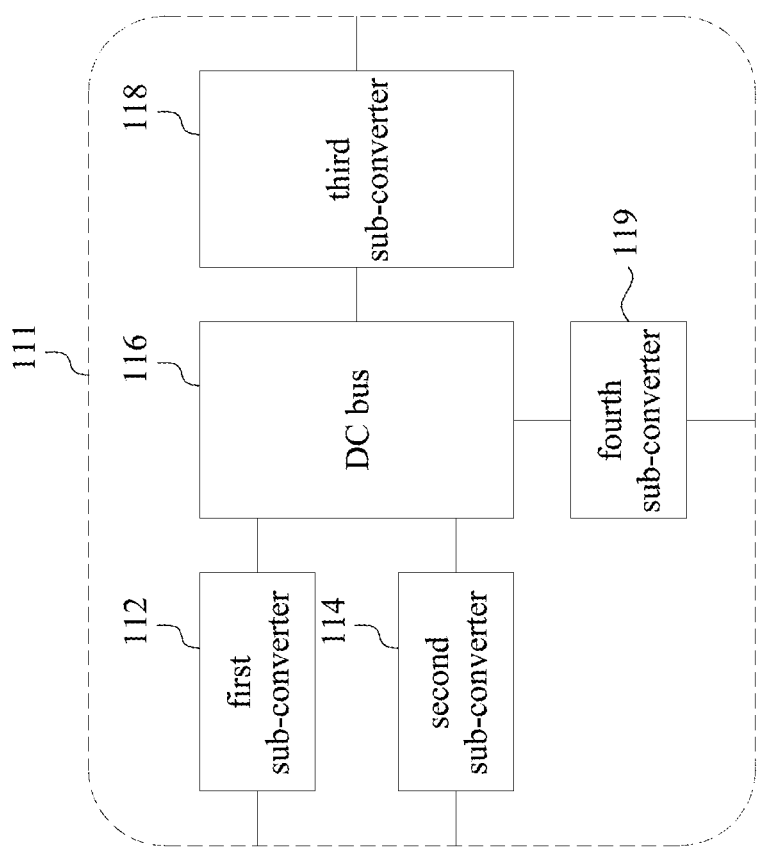
FIG. 10 depicts a schematic diagram of a power converting device of the power converting system shown in FIG. 9 according to one embodiment of the present disclosure.

FIG. 10 depicts a schematic diagram of the first converter 111 of the power converting device 110 of the power converting system 100 shown in FIG. 9 according to one embodiment of the present disclosure. As shown in FIG. 10, the first converter 111 of the power converting device 110 incudes a first sub-converter 112, a second sub-converter 114, a DC bus 116, a third sub-converter 118, and a fourth sub-converter 119.

Compared with FIG. 8, the first converter 111 of the power converting device 110 in FIG. 10 further includes a fourth sub-converter 119. The fourth sub-converter 119 is coupled to the DC bus 116 and the charging device 130. The fourth sub-converter 119 receives a power provided by the third power source 620 through the charging device 130 and converts the power provided by the third power source 620 to fit the DC bus 116, or charges the third power source 620 through the charging device 130. For example, the fourth sub-converter 119 can be a bidirectional DC-DC converter, such as a DAB series resonance converter, and the third power source 620 can be DC power source. The bidirectional DC-DC converter 119 is configured to receive the power provided by the DC power source 620, or configured to charge the DC power source 620. Therefore, the third power source 620 in FIG. 10 does not need the second converter 610 in FIG. 1 to transform DC electrical energy into AC electrical energy.

Figure 11:
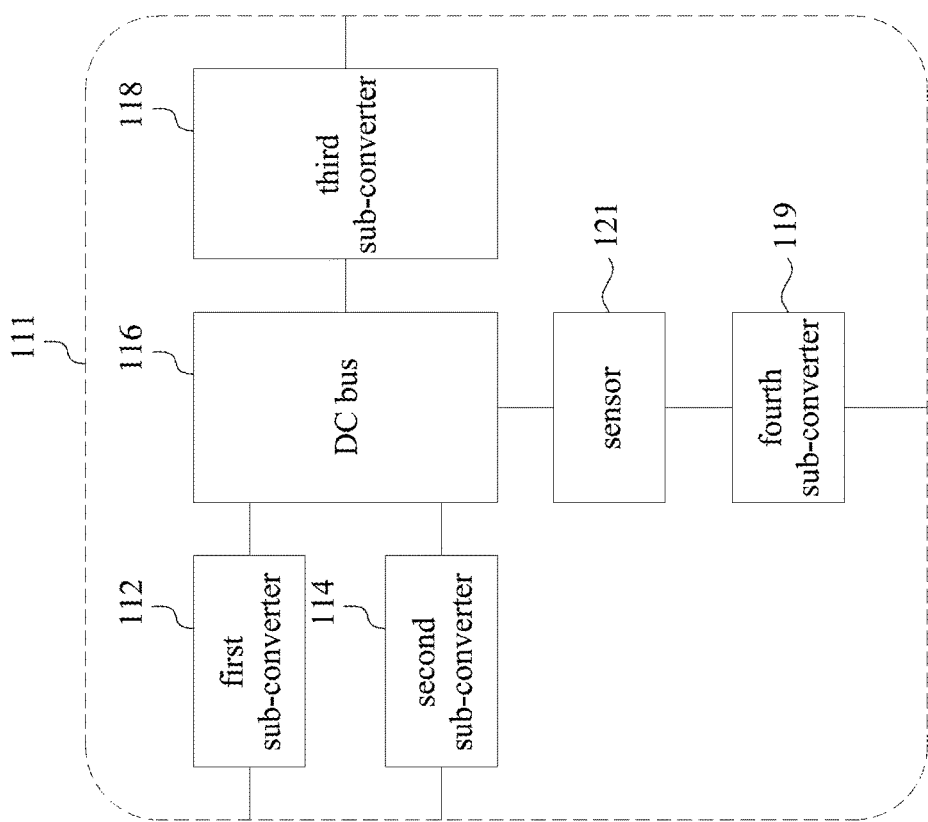
FIG. 11 depicts a schematic diagram of a power converting device of the power converting system shown in FIG. 9 according to one embodiment of the present disclosure.

FIG. 11 depicts a schematic diagram of the first converter 111 of the power converting device 110 of the power converting system 100 shown in FIG. 9 according to one embodiment of the present disclosure. Compared with FIG. 10, the first converter 111 of the power converting device 110 in FIG. 11 further includes a sensor 121. The sensor 121 is coupled to the DC bus 116. The sensor 121 can be configured to at least detect the state of the DC bus 116.

Figure 12:
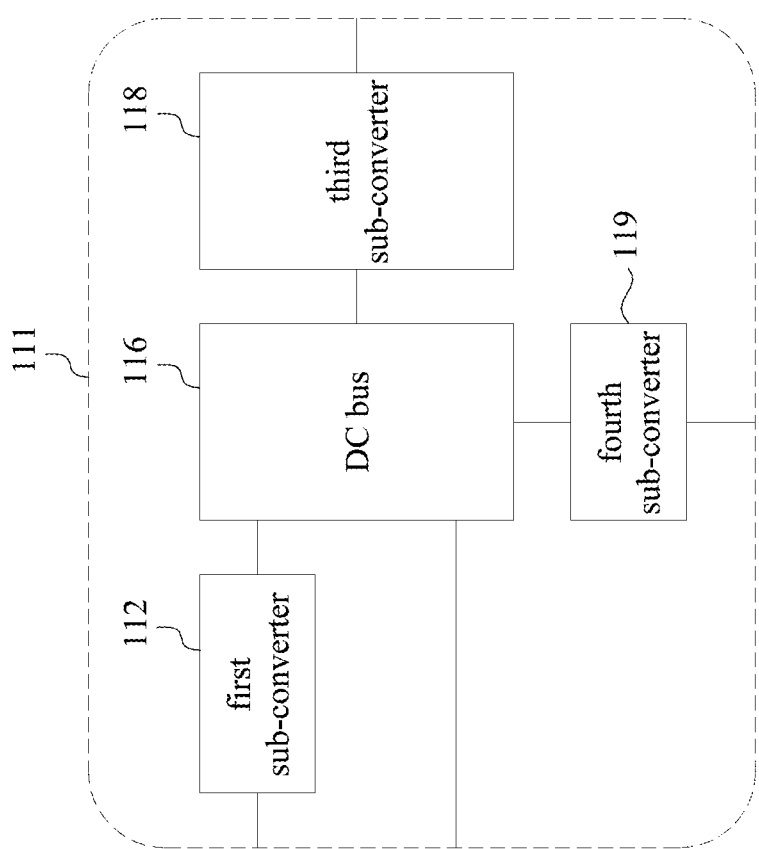
FIG. 12 depicts a schematic diagram of a power converting device of the power converting system shown in FIG. 9 according to one embodiment of the present disclosure.

FIG. 12 depicts a schematic diagram of the first converter 111 of the power converting device 110 of the power converting system 100 shown in FIG. 9 according to one embodiment of the present disclosure. Compared with FIG. 10, the power converting device 110 in FIG. 12 does not need the second sub-converter 114, and the power of the second power 300 can be transmitted to the DC bus 116 directly.

Figure 13:
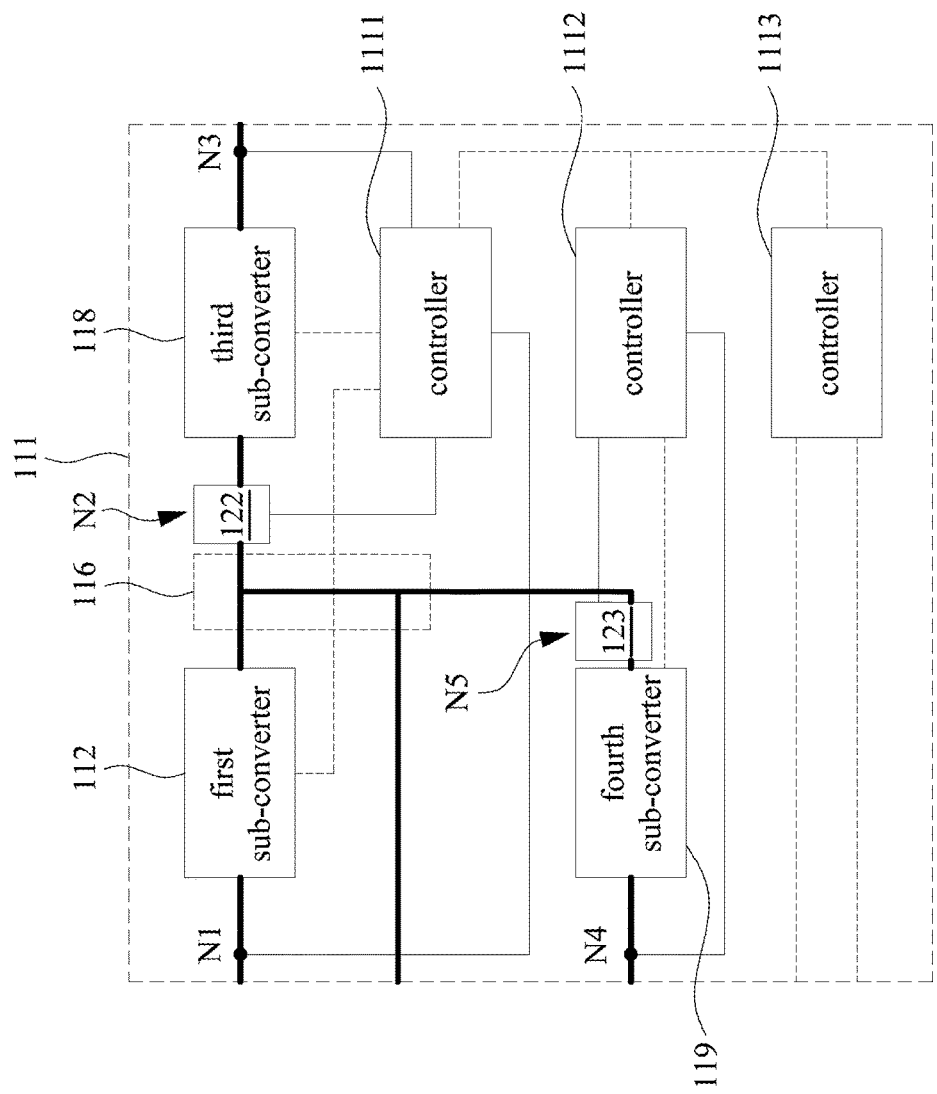
FIG. 13 depicts a schematic diagram of a power converting device of the power converting system shown in FIG. 12 according to one embodiment of the present disclosure.

FIG. 13 depicts a schematic diagram of the first converter 111 of the power converting device 110 of the power converting system 100 shown in FIG. 12 according to one embodiment of the present disclosure. As shown in FIG. 13, the first sub-converter 112 is coupled to the first power source 200. The DC bus 116 can be directly coupled to the second power source 300. The third sub-converter 118 is coupled to the DC bus 116, and the third sub-converter 118 is coupled to the protection device 120 through the sensor 115 and the protector 117. The fourth sub-converter 119 is coupled to the DC bus 116 and the charging device 130.

In one embodiment, the controller 113 of the first converter 111 of the power converting device 110 can be implemented by plural controllers, for example, controllers 1111, 1112, 1113. The controller 1111 can be configured to collect signals of nodes N1, N2, N3 for controlling the first sub-converter 112 and the third sub-converter 118. The controller 1112 can be configured to collect signals of nodes N4, N5 for controlling the fourth sub-converter 119. The controller 1113 is mainly configured to communicate with other devices. For example, the controller 1113 collects signals of the second power source 300 and the third power source 620, and communicates with the controller 1111 and the controller 1112.

In one embodiment, the first converter 111 of the power converting device 110 sets the sensor at the node N2 or the node N5. The sensor at the node N2 or the node N5 is configured to detect signals of the DC bus 116, and transmit the signals detected to the controllers 1111, 1112. Meanwhile, the third sub-converter 118 and the fourth sub-converter 119 can share the sensor so as to reduce the cost of the hardware.

When the sensor is at the node N2, the signals detected by the sensor are transmitted to the controller 1112 through a long distance, and as a result, the signals are interfered during the transmitting process. When the sensor is at the node N5, the signals detected by the sensor are transmitted to the controller 1111 through a long distance, and as a result, the signals are interfered during the transmitting process. In another embodiment, the first converter 111 of the power converting device 110 sets the sensors 122, 123 at the node N2 and the node N5, and each of the sensors 122, 123 is configured to detect the signals of the DC bus 116. The sensor 122 at the node N2 only needs to transmit the signals detected to the controller 1111 nearby, and the sensor 123 at the node N5 only needs to transmit the signals detected to the controller 1112 nearby, thereby avoiding interference during the transmitting process.

Figure 14:
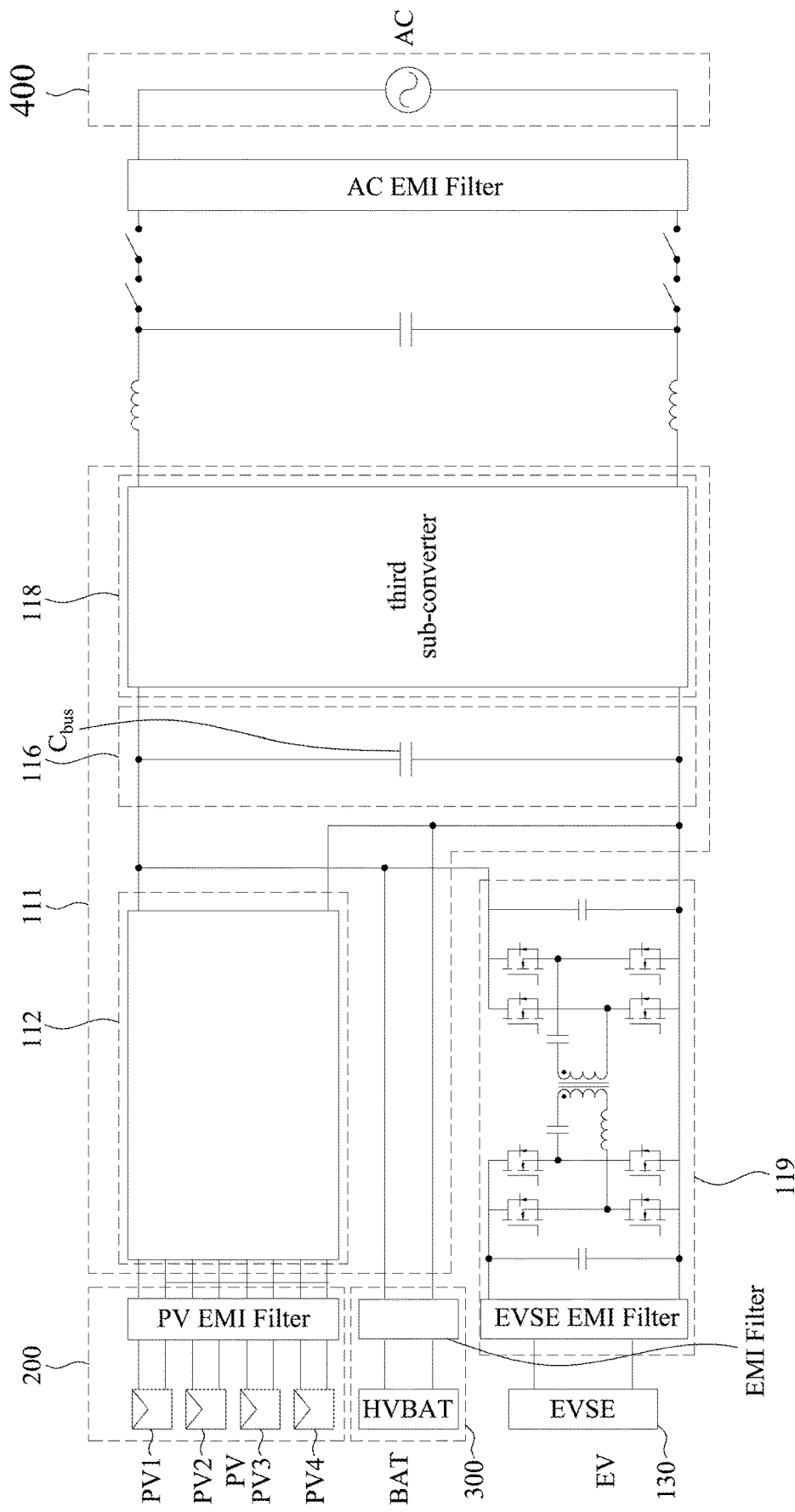
FIG. 14 depicts a schematic diagram of a power converting device of the power converting system shown in FIG. 9 according to one embodiment of the present disclosure.

FIG. 14 depicts a schematic diagram of the power converting device 110 of the power converting system 100 shown in FIG. 9 according to one embodiment of the present disclosure. As shown in FIG. 14, the power converting system includes a first sub-converter 112, a DC bus 116, a third sub-converter 118, and a fourth sub-converter 119. The first power source 200 can be Photovoltaics (PV) panel, the second power source 300 can be energy storage batteries (BAT), and the grid 400 can be single-phase AC grid. The charging device 130 can be a connector coupled to the movable energy storage device (such as electric vehicle) and the fourth sub-converter 119. The first sub-converter 112 can be a unidirectional DC-DC converter, for example, a boost converter. The DC bus 116 can be bus capacitors $C_{bus}$. The third sub-converter 118 can be a bidirectional DC-AC inverter. The fourth sub-converter 119 can be a bidirectional DC-DC converter, for example, a Dual-Active Bridge Series Resonant Converter (DAB-SRC).

The power converting system of the present disclosure can perform a compensation to the output of the charging device according to the signals detected. Besides, the controllers of the power converting device controls the multiple converters according to the signals detected so as to achieve the best power management. In addition, since input/output ports of the power converting device and the charging device are assembled together, volume and weight of the power converting system is reduced so as to achieve better thermal management, simpler connection, and so on.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A power converting system, comprising:
    a power converting device coupled to a first power source and a second power source;
    a protection device, coupled to the power converting device, a load, and a grid, and configured to switch electrical connections among the power converting device, the load, and the grid; and a charging device, coupled to the power converting device and a third power source;
wherein the power converting device further comprises a controller, a first converter and a sensor electrically connected to the controller, wherein the sensor detects a value of a public point between the first converter and the charging device to obtain a state of the charging device to provide to the controller, and the controller controls the power converting device to charge the third power source through the charging device, or receives electricity of the third power source through the charging device based on the value of the public point detected by the sensor; and
wherein the protection device further comprises:
a plurality of switches coupled to the power converting device, a transformer and a safe guard respectively, wherein the controller switches the plurality of switches to control the power converting device to operate in an on-grid work mode or an off-grid work mode and to select at least one power source of the first power source, the second power source, the third power source and the grid to provide electricity to the load according to multiple preset modes;
the transformer coupled to the power converting device, the load and the grid through the plurality of switches respectively, wherein the transformer is an auto transformer, and wherein the controller switches the plurality of switches to control the transformer to isolate from the grid in the on-grid work mode; and
the safe guard coupled between the grid and the plurality of switches.

2. The power converting system of claim 1, wherein the multiple preset modes include a first mode, and the controller controls the plurality of switches to control the power converting device to switch in the on-grid work mode to select the first power source to provide electricity to the load according to the first mode;
wherein the power converting device is configured to receive electricity of the first power source and provide the electricity of the first power source to the load through the protection device in the first mode.

3. The power converting system of claim 2, wherein in the first mode, the power converting device is further configured to provide the electricity of the first power source to the second power source and/or provide the electricity of the first power source to the third power source through the charging device, if the electricity of the first power source is larger than electricity required by the load; and
wherein the power converting device is further configured to provide the electricity of the first power source to the grid, or reduce the electricity of the first power source in response to the electricity of the first power source being larger than electricity required by the second power source, the load, and the third power source.

4. The power converting system of claim 1, wherein the multiple preset modes include a second mode, and the controller controls the plurality of switches to control the power converting device to switch in the on-grid work mode to select the second power source and/or the third power source to provide electricity to the load according to the second mode;
wherein the power converting device is configured to receive electricity of the second power source and/or the third power source, and provide the electricity of the second power source and/or the third power source to the load through the protection device in the second mode.

5. The power converting system of claim 4, wherein if the electricity of the second power source and the third power source is less than electricity required by the load, the controller further selects the grid to provide electricity to the load according to the second mode; and
wherein in response to the electricity of the second power source being larger than or equal to the electricity required by the load, the controller only selects the second power source to provide electricity to the load according to the second mode.

6. The power converting system of claim 4, wherein in the second mode, the power converting device receives the electricity of the grid and provides the electricity of the grid to the third power source during off-peak time, in response to the electricity stored in the third power source being lost.

7. The power converting system of claim 1, wherein the multiple preset modes include a third mode, and the controller controls the plurality of switches to control the power converting device to switch in the off-grid work mode to select the first power source to provide electricity to the load according to the third mode;
wherein the power converting device is configured to receive electricity of the first power source and provide the electricity of the first power source to the load through the protection device in the third mode.

8. The power converting system of claim 7, wherein in the third mode, the power converting device is further configured to provide the electricity of the first power source to the second power source and/or provide the electricity of the first power source to the third power source through the charging device in response to the electricity of the first power source being larger than electricity required by the load; and
wherein the power converting device is further configured to reduce the electricity of the first power source in response to the electricity of the first power source being larger than electricity required by the second power source, the load, and the third power source.

9. The power converting system of claim 1, wherein the multiple preset modes include a fourth mode, and the controller controls the plurality of switches to control the power converting device to switch in the off-grid work mode to select the second power source and/or the third power source to provide electricity to the load according to the fourth mode;
wherein the power converting device is configured to receive electricity of the second power source and/or the third power source, and provide the electricity of the second power source and/or the third power source to the load through the protection device in the fourth mode.

10. The power converting system of claim 9, wherein in response to the electricity of the second power source being larger than or equal to electricity required by the load, the controller only selects the second power source to provide electricity to the load according to the fourth mode.

11. The power converting system of claim 1, wherein
the controller, configured to communicate with the charging device and the third power source for determining whether to charge the third power source or discharge the third power source through the charging device.

12. The power converting system of claim 1, wherein the power converting device further comprises:
a protector, configured to disconnect the power converting device from the grid under an overcurrent state or an electrical leakage state.

13. The power converting system of claim 1, wherein the safe guard, configured to disconnect the power converting device from the grid under an overcurrent state or an electrical leakage state.

14. The power converting system of claim 1, wherein the first converter further comprises:
- a DC bus;
- a first sub-converter, coupled to the first power source and the DC bus, and configured to receive and adjust electricity of the first power source;
- a second sub-converter, coupled to the second power source and the DC bus, wherein the second sub-converter is configured to receive and adjust electricity of the second power source, or configured to charge the second power source; and
- a third sub-converter, coupled to the DC bus and the protection device.

15. The power converting system of claim 1, wherein the first converter further comprises:
- a DC bus;
- a first sub-converter, coupled to the first power source and the DC bus, and configured to receive and adjust electricity of the first power source; and
- a third sub-converter, coupled to the DC bus and the protection device;
- wherein the second power source is coupled to the DC bus.

16. The power converting system of claim 1, wherein the power converting device comprises a DC bus, the charging device is coupled to the DC bus.

17. The power converting system of claim 15, wherein the first converter further comprises a fourth sub-converter coupled to the charging device and the DC bus, wherein the fourth sub-converter is configured to receive and adjust electricity of the third power source, or configured to charge the third power source through the charging device.

18. The power converting system of claim 15, wherein the sensor, coupled to the DC bus, and configured to detect signals of the DC bus and provide the signals to the controller.

19. The power converting system of claim 17, wherein the first converter further comprises:
- a first sub-controller, at least configured to control the third sub-converter;
- a second sub-controller, at least configured to control the fourth sub-converter;
- wherein the sensor further comprises a first sub-sensor, coupled to the DC bus, and configured to detect signals of the DC bus, and provide the signals to the first sub-controller; and
- a second sub-sensor, coupled to the DC bus, configured to detect the signals of the DC bus, and provide the signals to the second sub-controller;
- wherein the first sub-sensor is adjacent to the first sub-controller, and the second sub-sensor is adjacent to the second sub-controller.

* * * * *